(12) United States Patent
Tang et al.

(10) Patent No.: US 12,039,683 B2
(45) Date of Patent: Jul. 16, 2024

(54) WebGL-BASED REPLACEABLE MODEL HYBRID RENDERING DISPLAY METHOD, SYSTEM AND STORAGE MEDIUM

(71) Applicant: HANGZHOU QUNHE INFORMATION TECHNOLOGY CO., LTD., Zhejiang (CN)

(72) Inventors: Rui Tang, Hangzhou (CN); Zhi Huang, Hangzhou (CN); Zhihui Wu, Hangzhou (CN); Jiaxiang Zheng, Hangzhou (CN); Fengjiao Cai, Hangzhou (CN); Chenpei Liu, Hangzhou (CN)

(73) Assignee: HANGZHOU QUNHE INFORMATION TECHNOLOGY CO., LTD., Hangzhou (CN)

( * ) Notice: Subject to any disclaimer, the term of this patent is extended or adjusted under 35 U.S.C. 154(b) by 216 days.

(21) Appl. No.: 17/638,852

(22) PCT Filed: Jun. 5, 2020

(86) PCT No.: PCT/CN2020/094760
§ 371 (c)(1),
(2) Date: Feb. 27, 2022

(87) PCT Pub. No.: WO2021/036394
PCT Pub. Date: Mar. 4, 2021

(65) Prior Publication Data
US 2022/0301273 A1    Sep. 22, 2022

(30) Foreign Application Priority Data
Aug. 30, 2019 (CN) .................... 201910814287.4

(51) Int. Cl.
G06T 19/20 (2011.01)
G06Q 30/0601 (2023.01)
G06T 15/04 (2011.01)

(52) U.S. Cl.
CPC ......... *G06T 19/20* (2013.01); *G06Q 30/0643* (2013.01); *G06T 15/04* (2013.01); *G06T 2200/04* (2013.01); *G06T 2219/2016* (2013.01)

(58) Field of Classification Search
None
See application file for complete search history.

(56) References Cited

U.S. PATENT DOCUMENTS 9,420,253 B2 *   8/2016   Baker ................ G06Q 30/0621
10,754,422 B1 *  8/2020   Hoyt ....................... G06F 17/16
(Continued)

FOREIGN PATENT DOCUMENTS

CN    103281345    9/2013
CN    103714167    4/2014
(Continued)

*Primary Examiner* — Jason A Pringle-Parker
(74) *Attorney, Agent, or Firm* — Jiwen Chen; Joywin IP Law PLLC

(57) ABSTRACT

The present invention discloses a WebGL-based replaceable model hybrid rendering display method, comprising the following steps: the cloud processing subsystem decomposes the original scene rendering image into a background rendering image and a 3D model of the default product, and generates a 3D model of the alternative product that replaces the default product, and stores and associate the background rendering image; the rendering engine of the terminal display subsystem loads the background rendering image based on the real-time rendering technology of WebGL, and dynamically loads and renders the 3D model of the default product or the 3D model of the selected alternative product on the background rendering image to form an image with collocation effect and display. The present invention also discloses a computer readable storage medium. The hybrid rendering display method and system greatly reduce the consumption of rendering resources, and also greatly reduces the waiting time required for rendering images.

9 Claims, 1 Drawing Sheet

(56) References Cited

U.S. PATENT DOCUMENTS

| | | | |
|---|---|---|---|
| 2011/0106881 A1* | 5/2011 | Douville | H04L 65/4015 |
| | | | 375/E7.026 |
| 2013/0135303 A1* | 5/2013 | Densham | G06T 17/00 |
| | | | 345/420 |
| 2013/0179841 A1* | 7/2013 | Mutton | G06T 19/003 |
| | | | 715/850 |
| 2014/0085314 A1 | 3/2014 | Steinke | |
| 2015/0325038 A1* | 11/2015 | Baker | G06T 15/50 |
| | | | 345/426 |
| 2017/0132841 A1* | 5/2017 | Morrison | G06V 20/20 |
| 2017/0161947 A1* | 6/2017 | Lindahl | G06T 19/20 |
| 2018/0114264 A1* | 4/2018 | Rafii | G06T 15/50 |
| 2019/0088016 A1* | 3/2019 | Tadros | G06T 19/003 |
| 2019/0156582 A1* | 5/2019 | Yankovich | G06Q 30/0633 |

FOREIGN PATENT DOCUMENTS

| | | |
|---|---|---|
| CN | 106204715 | 12/2016 |
| CN | 109861948 | 6/2019 |

\* cited by examiner

WebGL-BASED REPLACEABLE MODEL HYBRID RENDERING DISPLAY METHOD, SYSTEM AND STORAGE MEDIUM

This is a U.S. national stage application of PCT Application No. PCT/CN2020/094760 under 35 U.S.C. 371, filed Jun. 5, 2020 in Chinese, claiming priority to Chinese Patent Applications No. 201910814287.4, filed Aug. 30, 2019, all of which are hereby incorporated by reference.

TECHNICAL FIELD

The present invention belongs to the field of graphics rendering and display, and specifically relates to a WebGL-based replaceable model hybrid rendering and display method, system and storage medium.

BACKGROUND TECHNOLOGY

Web Graphics Library (WebGL) is a universal 3D graphics protocol that uses system graphics cards to display 3D scenes and models in the browser more smoothly, create complex navigation and data visualization.

With the popularization of virtual reality (VR), a rendered image represented by 360-degree panoramic images has become a widely accepted terminal visual display medium in home decoration effects and real-world displays. In addition, due to its strong communication, obvious visual impact, and especially traceable and interactive marketing, it has been widely used by decoration companies, real estate agencies and other industries. At present, the market has more and more demand for interactive panorama functions, especially in the soft decoration industry. Merchants hope to combine products as many as possible in a panorama, so that customers can realize the combination and thereby conclude a transaction. To this end, many technical solutions have also been proposed.

The most commonly used solution is to completely pre-render a limited number of panoramas and store them in a remote database. When it is necessary to replace the product mix in the scene, simply replace the entire panorama. Then this will bring the following two problems:

Problem 1. If there are N kinds of products (such as 3 kinds) and each replacement of M styles (such as 5 kinds), it is necessary to render M factorial of N (243) panoramas, which will cause exponential growth of rendering resources and storage resource overhead, and long rendering waiting time;

Problem 2: As the sizes of products are often different, if there is no manual inspection of the rendered images after the product is replaced, there may be collisions of the products and such renderings are unacceptable for most customers.

Another way is to build the entire scene in the cloud through a real-time rendering engine such as unity, and then render a panorama. The user opens the panoramic image on the terminal. Since the models of all items in the scene are dynamic, any items in the environment can be replaced at will, but this approach still brings two problems:

Problem 1. When the entire scene is loaded on the web (especially the mobile), 3D model needs to be greatly simplified and compressed, which will cause a huge gap between the overall visual effect of the mobile terminal and the cloud offline rendering effect, which cannot meet the need of users;

Problem 2: When the products in the scene are replaced, the replaced scene needs to be rendered in the cloud. In order to reduce the delay rate of the terminal display, the rendering processing needs to stay active in the cloud. As multiple-scene rendering processes occupy the running memory at the same time, it results in a limited number of replaceable scenes and not being promoted on a large scale.

SUMMARY OF THE INVENTION

The object of the present invention is to provide a WebGL-based replaceable model hybrid rendering display method, system and storage medium. The hybrid rendering display method, system and storage medium solves the problems of replacing scene renderings in exponential growth to satisfy pre-renderings. This greatly reduces the consumption of rendering resources, and can also greatly reduce the waiting time required for rendering images.

The technical scheme of the present invention is as follows:

A hybrid rendering display method is based on a replaceable model of WebGL. The system implementing the hybrid rendering display method comprises a cloud processing subsystem and a terminal display subsystem communicating with the cloud processing subsystem, wherein the hybrid rendering display method features in the following:

According to the replacement configuration of the default product in the original scene rendering image, the cloud processing subsystem decomposes the original scene rendering image into a background rendering image and a 3D model of the default product, and generates a 3D model of the alternative product that replaces the default product, and stores the background rendering image, the 3D models of both the default product and the alternative product, and associates the background rendering image, the 3D models of both the default product and the alternative product with the original scene rendering image;

The rendering engine of the terminal display subsystem loads the background rendering image based on the real-time rendering technology of WebGL, dynamically loads and renders the 3D models of both the default product and the alternative product on the background rendering image to form an image with collocation effect.

The hybrid rendering display method divides the visual display content of the terminal into two layers. The first layer is the background rendering image other than the alternative product that needs to be replaced. The background rendering image is generated by the cloud rendering engine. The effect is realistic as it is only a rendering image with fixed resolution which has minimal requirements on the terminal's performance; the other layer is the 3D model data of alternative products that are dynamically loaded in real time. Since only a limited number of 3D models are rendered at the same time, the terminal's performance requirements are also very small. 3D models of the alternative products can be moved arbitrarily, which can avoid product collision problems caused by interference between models. In addition, since only one background rendering image is needed, and the 3D models of the loaded alternative products can be any quantity, and there is no need to render a large number of rendering images in advance, and the waiting time can be reduced from a few hours to a few minutes, so the resource consumption can be reduced to too small to count. The hybrid rendering display method can simultaneously meet the six requirements of batch generation, good effect, fast speed, good dissemination, strong configuration and cross-platform.

A WebGL-based replaceable model hybrid rendering display system comprises:

at least two computer processors;

at least two computer memories for storing multiple computer programs, raw data and processing result data; and when the computer memory is executed by the computer processor, the hybrid rendering display method based on the replaceable model of WebGL is realized.

In the hybrid rendering display system, one of the processors can be used as the rendering engine in the cloud, and the other processor can be used as the rendering engine of the terminal. The hybrid rendering display method implemented by the hybrid rendering display system, solves the problem of replacing scene renderings in exponential growth to satisfy pre-renderings. The problem of replacing the entire rendering of the scene, which greatly reduces the consumption of rendering resources, and can also greatly reduce the waiting time required for the rendering.

A computer-readable storage medium has a computer program stored thereon, and when the computer program is executed by a processor, the hybrid rendering display method based on the replaceable model of WebGL is realized.

BRIEF DESCRIPTION OF DRAWINGS

In order to explain more clearly the present invention with examples or the present technical solutions, the following will briefly introduce the drawings that need to be used in the examples or the present technical solutions. Obviously, the following drawings only describe some examples of the present invention. For those ordinary technicians, other drawings can be obtained based on these drawings without creative work.

DETAILED DESCRIPTION OF THE EMBODIMENTS

In order to make the objects, technical solutions, and advantages of the present invention clearer, the following further describes the present invention in detail with reference to the drawings and examples. It should be understood that the specific examples described herein are only used to explain the present invention, and do not limit the protection scope of the present invention.

WebGL is a front-end and real-time rendering protocol that has been widely used in the computer industry. At present, most of 3D model display and editing applications running on the browser are developed based on WebGL. The dynamically loaded 3D model in the present invention and the ability to replace the 3D model are also developed based on a series of front-end interface capabilities provided by WebGL. Therefore, it can be easily adapted to PC, APP, applet and other browsers to achieve cross-platform.

In order to reduce the consumption of rendering resources and reduce the rendering waiting time on the top of the rendered image quality, the implementation allows a WebGL-based replaceable model hybrid rendering display method. The hybrid rendering display method decomposes the scene rendering image into a background rendering image and 3D model of a real-time rendered product. During application, the rendering engine dynamically loads 3D product model, realizes the unlimited replacement of any 3D product model in the rendering image and forms an effect of free collocation of any quantity of products to meet the needs of users.

Figure 1:
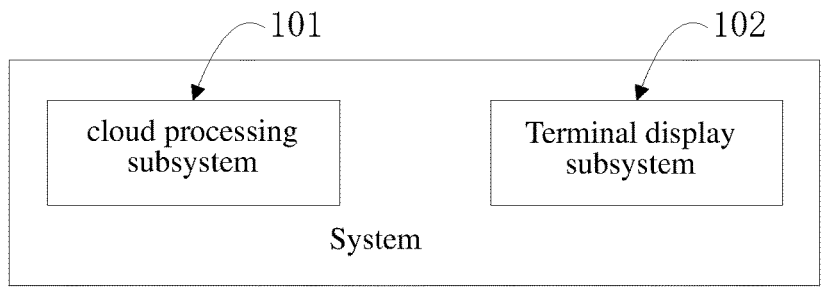
FIG. 1 is a schematic diagram of the system structure that applies the WebGL-based replaceable model hybrid rendering display method.

As shown in FIG. 1, the system that implements the WebGL-based replaceable model hybrid rendering display method comprises a cloud processing subsystem 101 and a terminal display subsystem 102 that communicates with the cloud processing subsystem 101. The cloud processing subsystem 101 mainly renders the scene to obtain the scene rendering image, and is also used to realize the decomposition of the original scene rendering image, and the setup of product models.

The terminal display subsystem 102 is mainly used to display the scene rendering, and edit the default product and the alternative product in the scene rendering according to the user's needs, and generate a collocation effect map. The terminal display subsystem can be a terminal platform such as a PC (including desktop computers, all-in-one computers, notebook computers, handheld computers, and tablet computers), mobile APP, and small programs.

Figure 2:
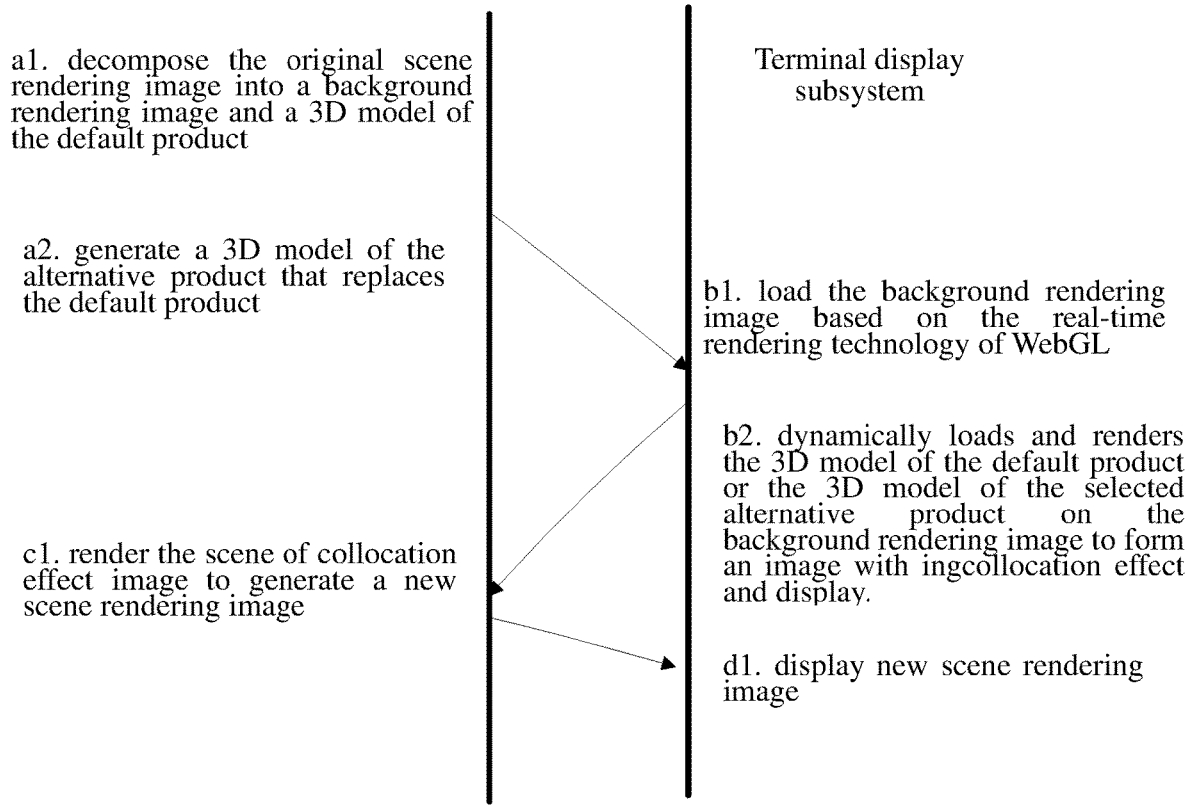
FIG. 2 is a schematic flowchart of a hybrid rendering display method supported by an example.

As shown in FIG. 2, the WebGL-based replaceable model hybrid rendering display method comprises the following steps:

According to the replacement configuration of the default product in the original scene rendering image, the cloud processing subsystem decomposes the original scene rendering image into a background rendering image and a 3D model of the default product, and generates a 3D model of the alternative product that replaces the default product, and stores the background rendering image, the 3D model of the default product and the 3D model of the alternative product, and associates the background rendering image, the 3D model of the default product, and the 3D model of the alternative product with the original scene rendering image.

After the designer has designed the scene plan, and set the rendering parameters, such as rendering lights, camera coordinates and attitude, etc., the designer uses the cloud server to perform global rendering of the designed scene, generate a rendering of the original scene containing the default products, and display the cloud server's feedback. Then the designer opens the original scene rendering in the rendering editor, selects alternative products that need to replace the default products in the original scene rendering, and completes the replacement configuration for the default products in the original scene rendering. Specifically, the replacement configuration of the default product in the original scene rendering image comprises:

determining the default products that can be replaced;

determining at least one alternative product to replace the default product, and associating the default product with the corresponding at least one alternative product.

When performing replacement configuration, one firstly determines the default products that can be replaced. For example, in a home scene, furniture, stoves, etc. can be selected as default products that will not be replaced, that is, mark these default products, and one then selects the alternative products that can be used to replace the default products in the list of alternative products, and associates these alternative products with the replaced default products. The mapping table can be used to associate, thus complete replacement of the default products in the original scene rendering and facilitate subsequent cloud processing system to decompose the original scene rendering image according to the replacement configuration.

The decomposition of the original rendering image is completed in the cloud processing subsystem 101. After the cloud processing subsystem receives the replacement configuration, it is ready to process the scene rendering image. It comprises two aspects. On the one hand, the original rendering scene image is decomposed into a background rendering image. The background rendering image can be displayed as a background image by the front end. Specifically, decomposing the original scene rendering image into the background rendering image comprises:

After removing the default product data from the original scene data in the corresponding original scene rendering image, the same rendering conditions as in the scene rendering image are applied to render the remaining data of the original scene to generate a background rendering image.

The deleted default product data is the default product checked in the replacement configuration. These default products can be selected according to needs. They can be part of the default products in the original scene rendering, or all default products. When part of the default products in the original scene rendering are removed, the background rendering image contains the remaining part of the default products. When these default products are rendered on the terminal, they will no longer be dynamically loaded and rendered in real time, or cannot be edited.

The corresponding original model data in the scene rendering comprises the 3D model structures of both the default product and the background, as well as the texture map of the default product. Adopting the same rendering conditions as the scene rendering means that the lighting conditions and camera positions used in re-rendering keep same as those applied in the original scene rendering, so as to allow that the rendered background has the same effect as the rendered scene.

The cloud processing subsystem 101 can decompose the scene rendering image into a background rendering image, and can also decompose the scene rendering image into a 3D model of the default product. Specifically, the 3D model that decomposes the scene rendering image into a default product comprises:

Packaging 3D model structure and texture map of the default product to generate a 3D model of the default product.

In addition to generating a 3D model of the default product, the cloud processing subsystem 101 also needs to generate a 3D model of the alternative product that replaces the default product, so that subsequent terminals can load and render in real time according to user requirements for display. Specifically, the generation replaces the default product. The 3D models of the alternative products of the product comprise:

Packaging 3D model structure and texture map of the alternative product to generate a 3D model of the alternative product.

After processing the background rendering, the 3D model of the default product, and the 3D model of the alternative product, storing the background rendering, the 3D model of the default product, and the 3D model of the alternative product in the cloud storage of the cloud processing subsystem 101, and associating the background rendering, the 3D model of the default product, and the 3D model of the alternative product with the original scene rendering to facilitate subsequent terminal calls and the cloud processing subsystem 101 to re-render the matching renderings returned by the user.

In order to ensure the real-time rendering fluency and real-time rendering effect of the default products and alternative products, before compressing and packaging 3D model structures and texture maps of both the default product and the alternative product, 3D model structures and texture maps of both the default product and the alternative product need to be checked;

When the 3D model structures and texture maps of both the default product and the alternative product are not suitable for the real-time display of the terminal display subsystem, the 3D model structures of both the default product and the alternative product also needs to be compressed, and the texture map of both the default product and the alternative product need to be optimized.

When the rendering engine of the terminal display subsystem is different from the rendering engine used by the cloud processing subsystem, or the rendering parameters are different, the rendering engine of the terminal display subsystem will not perform well in rendering the 3D models of default products and alternative products. The rendering speed is slow, and even the rendering engine of the terminal display subsystem is completely unable to render the 3D model of the default product and the alternative product. In this case, it means that the 3D model structure and texture map of the default product and the alternative product are not suitable. The real-time display of the terminal display subsystem requires preprocessing of the 3D model structure and texture map. Specifically, in order to improve the transmission efficiency and shorten the rendering time of the 3D model by the rendering engine of the terminal display subsystem, it is necessary to compress the 3D models of both default products and alternative products. In order to ensure the rendering quality of the terminal's 3D model, it is also necessary to optimize the texture maps of both default products and alternative products. Specifically, the cloud server will automatically reduce the size of the model according to the terminal screen resolution, GPU performance, bandwidth, etc, which reduces the dependence on terminal performance and improves loading speed with minimal reduction in visual perception. In addition, the materials will be automatically merged and reduced accordingly to reduce the number of loaded materials or the volume exceeds the terminal limit so as to realize the adaptation of each end.

When the cloud processing subsystem finishes processing, the terminal display subsystem can display based on the background rendering image, the 3D models of both the default product and the alternative product.

The rendering engine of the terminal display subsystem loads the background rendering image based on the real-time rendering technology of WebGL, and dynamically loads and renders the 3D model of the default product or the 3D model of the selected alternative product on the background rendering image to form a collocation effect map and display.

When the terminal display subsystem displays the rendering, the first display is the original scene rendering that contains the default product. It is used to click the replacement function according to demand, that is, to enter the replacement environment of default product. The feature of the replacement environment is that the original scene rendering image is updated as the background rendering image excluding the default product, and the processed 3D model of the default product is dynamically loaded on the background rendering map, and real-time rendering is performed, and the size, attitude and position are exactly the same as the default product in the original scene rendering image. When entering the replacement environment, the terminal display subsystem may also present functions for users to edit, that is, the hybrid rendering display method further comprises the following steps:

The terminal display subsystem provides a thumbnail list of alternative products, as well as an interface for editing default products and alternative products. Users can edit the default products and alternative products according to their needs to build a collocation effect map.

After the user clicks on the default product, a thumbnail list of the alternative products will be displayed in the terminal display subsystem. The user clicks the alternative product to replace the default product and this process can be repeated to achieve the effect of free collocation of alternative products. In addition, you can also perform editing operations on any alternative products and default products. Editing operations include moving, rotating, or deleting. After the matching is completed, the collocation effect image can be obtained. The matching rendering is not a high-quality rendering that integrates the product and the background, so it can optionally initiate a high-quality rendering request to the cloud server. Specifically, the hybrid rendering display method further comprises:

After forming the matching rendering, the terminal display subsystem sends a rendering request containing the matching rendering to the cloud processing subsystem;

The cloud processing subsystem renders the scene with the collocation effect according to the collocation effect image, and generates a new scene rendering image to respond to the terminal display subsystem.

In application, the user clicks on rendering through the interface, and a rendering task will be initiated to the server in the cloud processing subsystem. The server will re-render the scene and return a new scene rendering that will be fully integrated with the background rendering. Then the new scene rendering can be transmitted.

This WebGL-based hybrid rendering display method of replaceable models uses offline rendering of 3D data that does not need to be replaced as a background rendering, which retains the overall light and shadow effects of the screen to be realistic enough; and the product which need to be replaced are rendered in real time and loaded dynamically by rendering engine so that the number of replaceable products is almost unlimited, which meets the needs of customers for free collocation.

The hybrid rendering model-replaceable display method is based on WebGL, so there is no need to render exponential product collocation in advance. It can greatly save rendering resources and also reduce rendering time from several hours to several minutes, thus customer waiting time gets reduced greatly.

Because replaceable products are dynamically loaded with the WebGL-based hybrid model-replaceable rendering display method, the products can be edited such as moving, rotating, etc., avoiding the invalid rendering waste caused by unexpected collisions between models.

The WebGL-based hybrid model-replaceable rendering display method requires a limited number of product models that need to be dynamically loaded, so the performance requirements of the terminal are very low, and it has good cross-platform feature and can be applied to most mobile devices.

Another implementation also allows a WebGL-based replaceable model hybrid rendering display system, comprising:

at least two computer processors; and at least two computer memories for storing multiple computer programs, raw data and processing result data;

When the computer memory is executed by the computer processor, the WebGL-based replaceable model hybrid rendering display method is realized.

In the hybrid rendering display system, one of the processors can be used as the rendering engine of the remote cloud, and the other processor can be used as the rendering engine of the terminal.

The specific steps and effects of the rendering hybrid rendering display method implemented by the hybrid rendering display system are the same as the above-mentioned hybrid rendering display method, and which will not be repeated here.

In practical applications, the computer memory can be a volatile memory at the near end, such as RAM, or such as ROM, FLASH, floppy disk, mechanical hard disk, etc., or a remote storage cloud.

The computer processor can be a central processing unit (CPU), a microprocessor (MPU), a digital signal processor (DSP), or a field programmable gate array (FPGA). That is, the method steps of the rendering hybrid rendering display can be realized through these processors.

Another implementation allows a computer-readable storage medium on which a computer program is stored, and when the computer program is executed by a processor, the above-mentioned WebGL-based replaceable model hybrid rendering and display method is realized.

The above-mentioned hybrid rendering display method and system integrate the rendering images generated by the cloud offline rendering engine with realistic effects and the dynamic 3D model that can be rendered in real time on the user side, without rendering massive rendering images in advance; in addition, the 3D model of the product can be moved arbitrarily in the front end to avoid collisions between models, so as to achieve a visual effect close to offline rendering, and to freely match any number of models, thereby achieve the goal of "light design" for home furnishings.

The technical scheme and beneficial effects of the present invention are described in the specific implementation mode above. It should be understood that the above descriptions are only the most preferred examples of the present invention and are not intended to limit the present invention. Any modifications, additions and equivalent replacements made within the scope shall be included in the protection scope of the present invention.

The invention claimed is:

1. A WebGL-based replaceable model hybrid rendering display method, wherein a system realizing the hybrid rendering display comprises a cloud processing subsystem and a terminal display subsystem communicating with the cloud processing subsystem, wherein the hybrid rendering display method comprises the following steps:

according to the replacement configuration of a default product in an original scene rendering image, the cloud processing subsystem decomposing the original scene rendering image into a background rendering image and a 3D model of the default product, and generating a 3D model of an alternative product that replaces the default product, and stores the background rendering image, the 3D model of the default product and the 3D model of the alternative product, and associating the background rendering image, the 3D model of the default product, and the 3D model of the alternative product with the original scene rendering image;

a rendering engine of the terminal display subsystem loading the background rendering image based on the real-time rendering technology of WebGL, and dynamically loading and rendering the 3D model of the default product or the 3D model of the selected alternative product on the background rendering image to form an image with collocation effect and display;

wherein decomposing the scene rendering into a 3D model of the default product comprises:

packaging 3D model structure and texture map of the default product and generate a 3D model of the default product;

generating 3D model of the alternative product that replaces the default product comprises:

packaging 3D model structure and texture map of the alternative product and generate a 3D model of the alternative product.

2. The WebGL-based replaceable model hybrid rendering display method of claim 1, wherein the replacement configuration of the default product in the original scene rendering image comprises:

determining the default product that will be replaced;

determining at least one alternative product to replace the default product, and associating the default product with at least one corresponding alternative product.

3. The WebGL-based replaceable model hybrid rendering display method of claim 1, wherein decomposing the original scene rendering image into the background rendering image comprises:

after removing the default product data from the original scene data in the corresponding original scene rendering image, applying the same rendering conditions as in the scene rendering image to render the remaining data of the original scene to generate a background rendering image.

4. The WebGL-based replaceable model hybrid rendering display method of claim 1, wherein before compressing and packaging 3D model structures and texture maps of both the default product and the alternative product, 3D model structures and texture maps of both the default product and the alternative product need to be checked;

when 3D model structures and texture maps of both the default product and the alternative product are not suitable for the real-time display of the terminal display subsystem, the 3D model structure of both the default product and the alternative product also needs to be compressed, and the texture map of both the default product and the alternative product need to be optimized.

5. The WebGL-based replaceable model hybrid rendering display method of claim 1, wherein the hybrid rendering display method further comprises:

after forming the image with collocation effect, the terminal display subsystem sending a rendering request containing the image with collocation effect to the cloud processing subsystem;

the cloud processing subsystem rendering the scene according to the image with collocation effect, and generating a new scene rendering image to respond to the terminal display subsystem.

6. The WebGL-based replaceable model hybrid rendering display method of claim 1, wherein the hybrid rendering display method further comprises:

the terminal display subsystem providing a thumbnail list of alternative products, as well as an interface for editing default products and alternative products; and users editing the default products and alternative products according to their needs to build a collocation effect map.

7. The WebGL-based replaceable model hybrid rendering display method of claim 6, wherein the editing operation is comprised of moving, rotating or deleting.

8. A WebGL-based replaceable model hybrid rendering display system, comprising:

at least two computer processors; and at least two computer memories for storing multiple computer programs, raw data and processing result data;

wherein when the computer memory is executed by the computer processor, for the WebGL-based replaceable model hybrid rendering and display method according to claim 1.

9. A non-transitory computer readable storage medium on which computer programs are stored and when the computer programs are executed by the processor, a WebGL-based replaceable model hybrid rendering display method is realized as described in claim 1.

* * * * *